HYDRAULIC PROPULSION SYSTEM

Filed April 28, 1965 4 Sheets-Sheet 1

INVENTORS
JEROME O. JUST
HOWARD W. STERN

BY
Thomas W. Ehrmann

ATTORNEY

Oct. 24, 1967 J. O. JUST ETAL 3,348,624

HYDRAULIC PROPULSION SYSTEM

Filed April 28, 1965 4 Sheets-Sheet 2

INVENTORS
JEROME O. JUST
HOWARD W. STERN

BY Thomas W. Ehrmann

ATTORNEY

HYDRAULIC PROPULSION SYSTEM

INVENTORS
JEROME O. JUST
HOWARD W. STERN

BY Thomas W. Ehrmann

ATTORNEY

Oct. 24, 1967 J. O. JUST ET AL 3,348,624

HYDRAULIC PROPULSION SYSTEM

Filed April 28, 1965 4 Sheets-Sheet 4

INVENTORS
JEROME O. JUST
HOWARD W. STERN

BY Thomas W. Ehrmann

ATTORNEY 3,348,624
Patented Oct. 24, 1967

3,348,624

HYDRAULIC PROPULSION SYSTEM

Jerome O. Just, Hartland, and Howard W. Stern, Milwaukee, Wis., assignors to Aquatic Controls Corporation, Hartland, Wis., a corporation of Wisconsin Filed Apr. 28, 1965, Ser. No. 451,416
5 Claims. (Cl. 180—66)

This invention relates to a hydraulic propulsion system, and more particularly to a multiple speed hydraulic propulsion system for driving a wheeled vehicle and in which hydraulic motors drivingly connected to the wheels of the vehicle are supplied with hydraulic fluid by a constant displacement pump, and wherein the speed at which the motors drive the vehicle is controlled by dividing the output of the pump into selected numbers of shares to provide the motors with different quantities of fluid per unit time and thereby achieve different speeds. The invention further resides in providing selectable means for achieving such multiple speed propulsion in both a forward and reverse direction.

While the propulsion system of this invention may be applied to vehicles generally, it has particular application for use on amphibious vehicles. If a conventional power train, including a transmission, a clutch, a drive shaft, and gearing between the drive shaft and the driven axle, is employed on amphibious vehicles considerable care must be taken to afford protection to the elements of the power train when the vehicle is operating in water and the elements may be wholly or partially submerged. Consequently, conventional power trains have inherent objectional features when used on amphibious vehicles.

The hydraulic propulsion system of this invention can achieve the same results as a conventional power train without being subject to its disadvantages and limitations. No protection is necessary beyond that required to seal the hydraulic system against the pressure of the hydraulic fluid in the system. The hydraulic motors can be applied directly adjacent the driven axles of the vehicle and be connected to a pump and controls by simple hydraulic lines thereby eliminating the need for extensive drive shafts that must be protected. And yet, the hydraulic propulsion system provides selectable multiple speeds both in forward and reverse direction of the vehicle with the speed and direction of drive being controlled by simple valves connected in the system between the motors and the constant displacement hydraulic pump.

It is an object of this invention to provide an improved multiple speed hydraulic propulsion system for wheeled vehicles.

It is another object of this invention to provide a hydraulic propulsion system for a wheeled vehicle which can drive the vehicle at selectable multiple speeds both in forward and reverse directions.

It is also an object of this invention to provide such a hydraulic propulsion system in which control of the direction and speed is accomplished by simple valves.

It is still another object of this invention to provide such a hydraulic propulsion system in which as many different speeds can be selected as there are hydraulic motors driving the vehicle.

It is another object of this invention to provide an improved adjustable mechanism for drivingly connecting the hydraulic motors of a hydraulic propulsion system to the wheels of the vehicle.

The foregoing and other objects and advantages of this invention will appear in the description which follows. In the description reference is made to the accompanying drawings which form a part hereof and in which there is shown a particular embodiment of the invention. The embodiment will be described in detail to enable those skilled in the art to practice the invention. However, it will be obvious that changes can be made in the structure and arrangement of the illustrated embodiment without departing from the scope of the invention.

Figure 1:
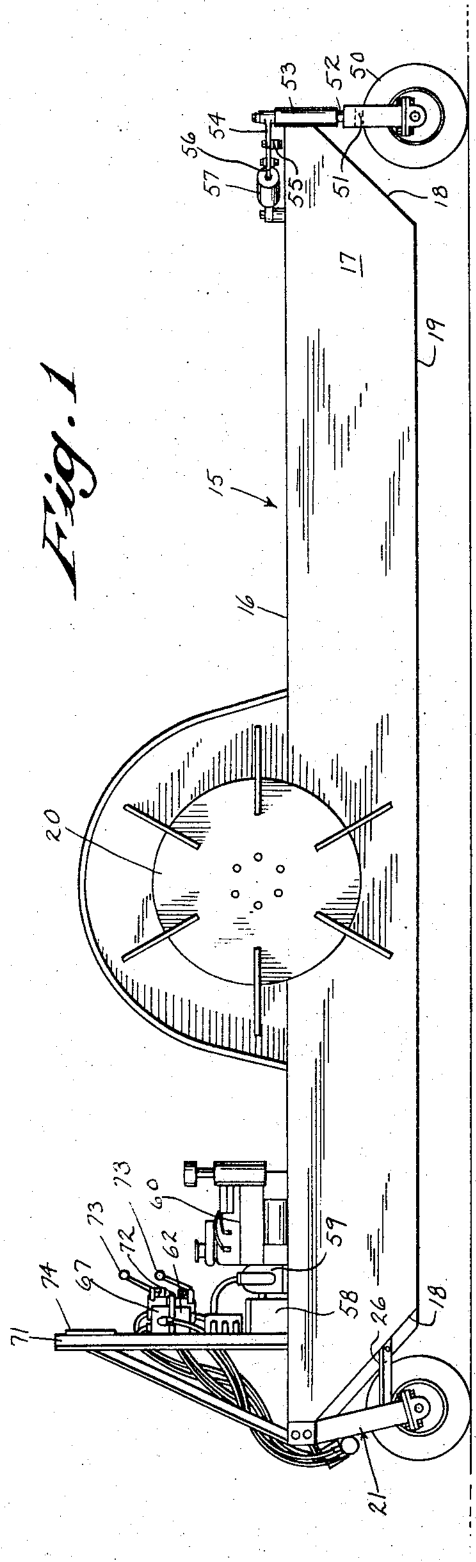
FIG. 1 is a side view in elevation of an amphibious barge to which the hydraulic propulsion system may be applied.

Referring now to the drawings, in FIG. 1 the hydraulic propulsion system is shown applied to a barge 15 having a flat deck 16, depending sides 17, inwardly inclined front and rear end plates 18 and a bottom plate 19 all of which are integrally joined as by welding to produce a watertight hollow tank which gives the requisite buoyancy to the barge 15. The barge 15 may mount paddle wheels 20 for propulsion through the water.

A pair of generally U-shaped fabricated supports, indicated generally by the numeral 21, are mounted adjacent the sides 17 at the rear of the barge 15. The supports 21 each include a crossbar portion 22 and a pair of depending legs 23. Spaced brackets 24 extend upwardly from a crossbar portion 22 of each support 21 to be bolted to brackets 25 projecting from the blunt rear edge of the barge 15. Angle irons 26 extend from the rear end plate 18 to the legs 23 to provide additional rigidity for the supports 21.

Figure 3:
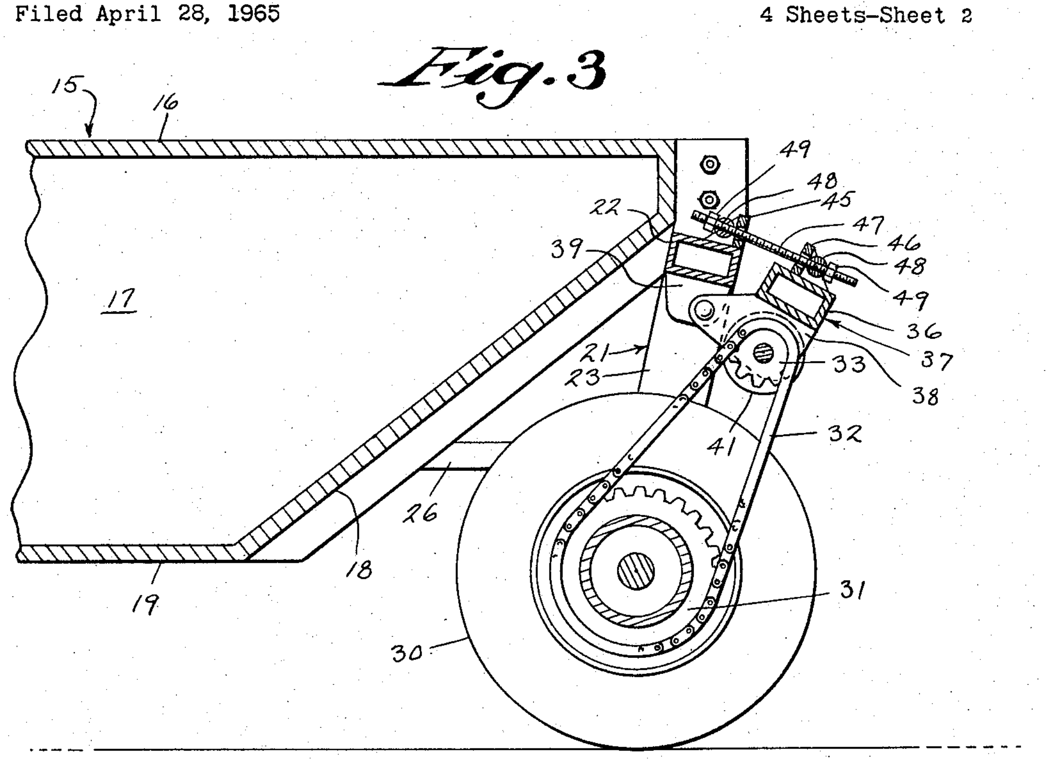
FIG. 3 is an enlarged view in vertical section taken in the plane of the line 3—3 of FIG. 2.

The bottom ends of the legs 23 of each support 21 mount bearing blocks 27 that receive bearings in which the ends of an axle 28 are journaled. Between each pair of legs 23, the axle 28 rigidly mounts a large diameter quill shaft 29. Each of the quill shafts 29 supports a spaced pair of pneumatic tires 30 and a driven sprocket wheel 31 disposed between the tires 30 (see FIG. 3).

Each driven sprocket wheel 31 engages an endless chain 32 that is also received about a driving sprocket wheel 33 secured to a shaft 34. The shafts 34 are journaled in bearing blocks 35 that are secured to a crossbar portion 36 of a yoke 37. The yokes also include spaced depending end plates 38 each of which includes a portion that extends rearwardly and is pinned to a depending bracket 39 affixed to the underside of the crossbar portion 22 of a support 21.

Figure 2:
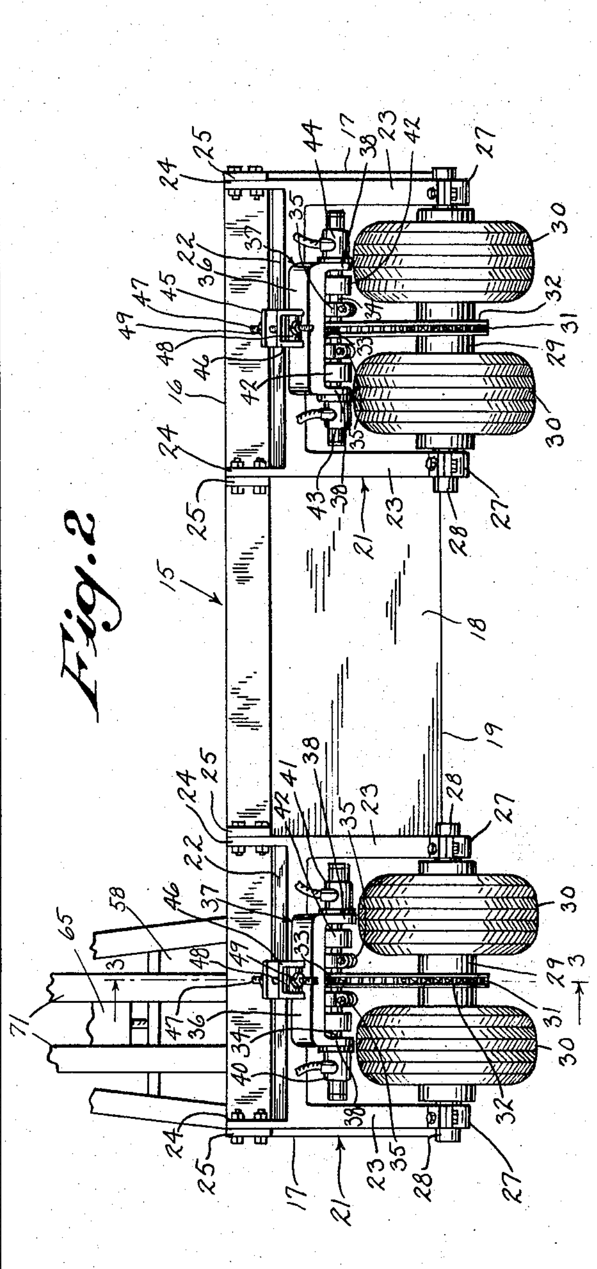
FIG. 2 is a rear view in elevation of the barge of FIG. 1 showing the driving wheels and connected hydraulic motors.

Referring to FIG. 2, outer and inner left side hydraulic motors 40 and 41, respectively, are secured to the outer surface of the end plates 38 of the left hand wheel structure with output shafts of the hydraulic motors 40 and 41 extending through openings in the end plates 38 and being connected by flexible couplings 42 to the ends of the shaft 34 that supports the driving sprocket wheel 33. The right hand yoke 37 also mounts inner and outer right side hydraulic motors 43 and 44, respectively, which are likewise secured to the end plates 38 and coupled to a shaft 34.

It will be appreciated that the yokes 37 may pivot about the pinned connections to the supports 21, and means are provided to hold the yokes 37 in selected positions relative to the supports 21 so as to permit adjustment of the sprocket wheels 31 and 33 relative to each other to achieve the proper tension in the chains 32. Such means include a bracket 45 mounted on the top of the crossbar portion 22 of each support 21 and a second bracket 46 mounted on the top of the crossbar portion 36 of each yoke 37. The brackets 45 and 46 each have a central opening that receives a threaded rod 47. Cylindrical rollers 48 having through bores that receive the threaded rods 47 bear against the brackets 45 and 46 and are held in place by nuts 49 on the rods 47. It will be seen that the position of each yoke 37 may be adjusted relative to a support 21 by adjusting the position of the nuts 49 on the threaded rod 47 with the rollers 48 providing a proper bearing surface against the brackets 45 and 46.

Figure 4:
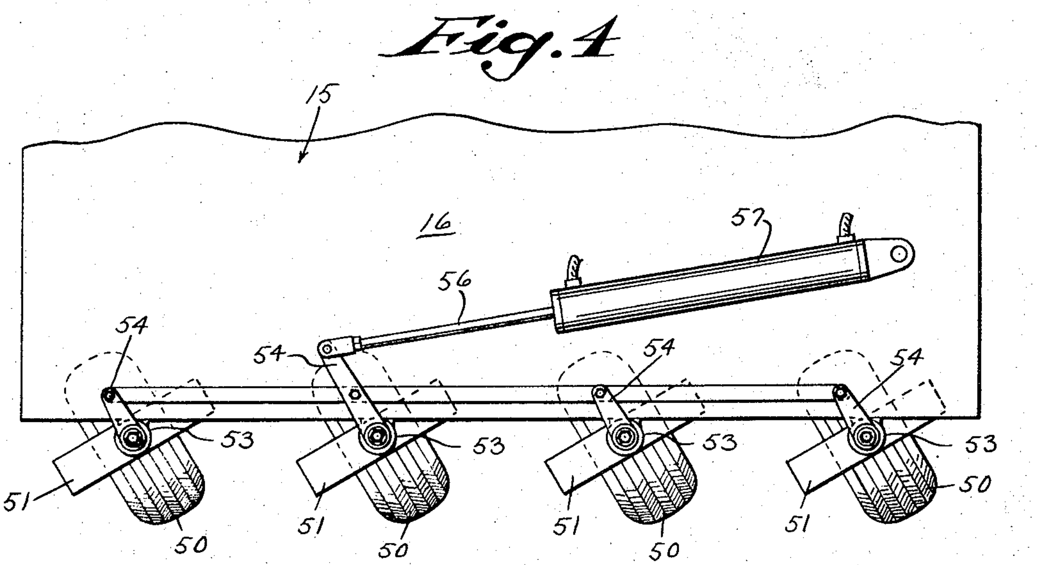
FIG. 4 is a top plan view of the barge and showing a steering system which may be applied with the hydraulic propulsion system of this invention.
Figure 5:
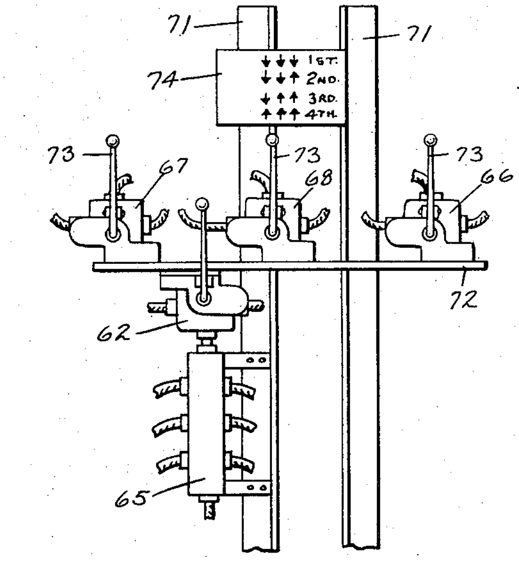
FIG. 5 is a view in elevation of a portion of a control station for the hydraulic propulsion system.

The front end of the barge 15 mounts four steerable pneumatic tires 50 each of which has its axle supported in a U-shaped yoke 51 with an upright shaft 52 extending centrally from the crossbar of each yoke 51 and through cylindrical bearings 53 secured to the blunt front edge of the barge 15. The shafts 52 project through the top of the bearings 53 and mount crank arms 54. The crank arms 54 are pivotally joined by a rod 55 so as to operate in unison. One of the crank arms 54 is longer than the others to extend to an opposite side of the rod 55. Such crank arm is pivotally connected to a piston rod 56 of a hydraulic steering cylinder 57. It will be appreciated from an examination of FIG. 4 that the steering of the barge 15 is accomplished by feeding hydraulic fluid under pressure to one or the other sides of the piston in the cylinder 57 with the result that the piston rod 56 is extended or retracted and thereby pivots each of the yokes 51 and the tires 50 to a desired direction.

The barge 15 is driven on land by providing hydraulic fluid under pressure to the motors 40, 41, 43 and 44. The fluid is supplied from a reservoir 58 by a constant displacement pump 59 driven by a gasoline or diesel engine 60. The reservoir 58, pump 59 and engine 60 are mounted on the deck 16.

The hydraulic motors 40, 41, 43 and 44 are identical commercially available reversible motors. The pump 59 may be a commercially available constant displacement gear type pump. The speed at which the hydraulic motors will be driven will be dependent upon the rate of flow of hydraulic fluid through the motors from the pump 59. Speed control means incorporating valves is provided to control the speed at which the motors will drive the barge. Such control means is illustrated schematically in FIGS. 6 through 9.

Each motor of a pair of motors 40, 41 or 43, 44 must rotate in a direction opposite to the other motor of the pair in order to drive the rear wheels 30. Since the motors are reversible and have two inlet-outlet ports, in FIG. 6 like ports of the motors are designated by like letters. Thus, the two ports to the motor are designated by the letters A and B to facilitate the description of their connection in the control circuit. The pump 59 has its inlet connected to the supply of hydraulic fluid in the reservoir 58 and its outlet connected by an outlet conduit 61 to one side of a main forward and reverse valve 62. A return conduit 63 is also connected to such side of the forward and reverse valve 62 and leads back to the reservoir 58.

An input conduit 64 leads from the other side of the forward and reverse valve 62 to connect to an input manifold 65 which in turn connects with one side of each of three control valves 66, 67 and 68 and also to the B port of the outside right motor 44. A return conduit 69 is connected between the other side of the forward and reverse valve 62 and a return manifold 70. The return manifold 70 leads from the same side of each of the control valves 66, 67 and 68 and from the B port of the outside left motor 40. The A ports of the left motors 40 and 41 both connect to an opposite side of the control valve 66, the B ports of the inside left and right motors 41 and 43, respectively, similarly connect to the other side of the control valve 67, and the A ports of the right motors 43 and 44 connect to the other side of the control valve 68.

Figure 6:
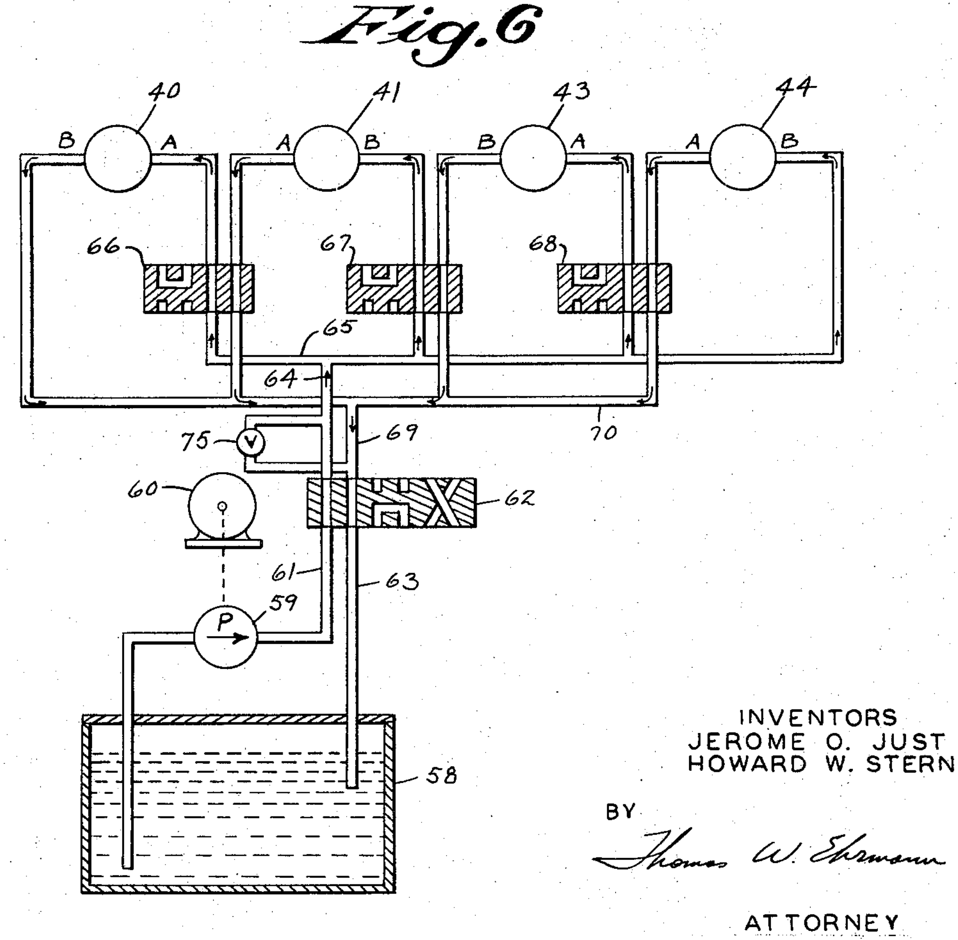
FIG. 6 is a schematic diagram of the hydraulic control system for the hydraulic motors.

The forward and reverse valve 62 has a spool that is illustrated in FIG. 6 and is adapted to be shifted to assume one of three available positions. In the position illustrated, the forward and reverse valve 62 provides a direct connection between the outlet conduit 61 of the pump 59 and the input conduit 64 as well as a direct connection between the return conduits 69 and 63. If such valve 62 is shifted to the left as viewed in FIG. 6 the middle position of the valve 62 diverts the output of the pump 59 directly to the reservoir 58 and isolates the motors from the pump 59 and reservoir 58. If the forward and reverse valve 62 is shifted to the extreme left as viewed in FIG. 6 the valve 62 will provide a crossover connection whereby the outlet conduit 61 of the pump 59 will be connected to the return conduit 69 and the inlet conduit 64 will be connected to the return conduit 63. This latter position of the valve 62 will cause a reversal in the direction in which the propulsion system will drive the barge 15.

Each of the control valves 66, 67 and 68 is shiftable between two positions. In the position shown in FIG. 6, the control valves connect the input manifold 65 to the A ports of the outside left and inside right motors 40 and 43, which must turn in the same direction, and to the B ports of the inside left and outside right motors 41 and 44, which must turn in the same direction. In this same position of the control valves, the A ports of the inside left and outside right motors 41 and 49, respectively, are connected to the return manifold 70, and the B ports of the outside left and the inside right motors 40 and 48, respectively, are connected to the return manifold 70. It will be seen that when each of the control valves 66, 67 and 68 is in the position illustrated in FIG. 6 that the motors 40, 41, 43 and 44 are in parallel with each other relative to the pump 59 and reservoir 58.

In the alternate position of each of the control valves 66, 67 and 68 the connections from the input manifold 65 and the return manifold 70 are blocked at the control valve and the adjacent ports of the motors will be connected together. Thus, if each of the control valves 66, 67 and 68 were shifted to the right, the four motors would be in series relative to the pump 59 and reservoir 58.

The illustrated embodiment of the hydraulic propulsion system provides for four speeds in both forward and reverse directions. The first or lowest speed will be achieved when the control valves are set in the position illustrated in FIG. 6. That is, the motors are in parallel. Since there is a parallel connection of each of the motors to the input manifold 65 the continuous quantity of fluid per unit time delivered by the pump 59 will be divided equally between the four motors and each motor will receive one-fourth of the output of the pump 59. This will cause the outside left motor 40 and the inside right motor 43 to rotate their output shafts in a clockwise direction as viewed from the output shaft of the motors, and the inside left motor 41 and the outside right motor 44 will drive their output shafts in a counterclockwise direction again as viewed from the output shaft of the motors.

Figure 7:
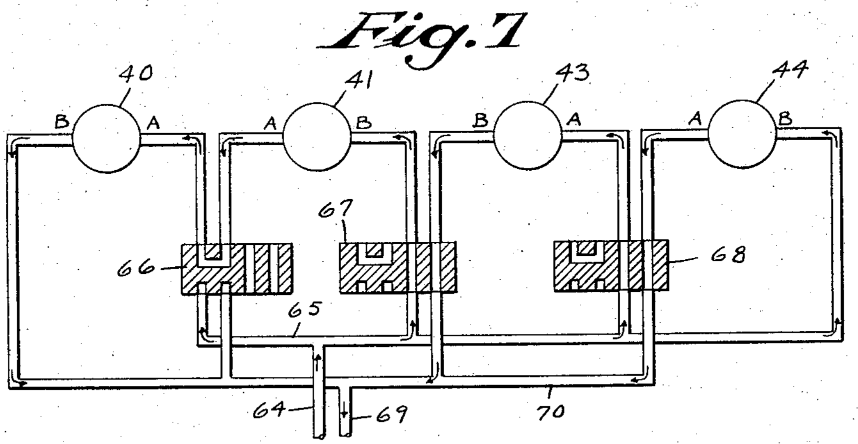
FIGS. 7, 8 and 9 are schematic diagrams of portions of the hydraulic control system of FIG. 6 showing the disposition of control valves for various speeds at which the hydraulic motors can drive the barge.

The second higher speed may be achieved when the control valves are in the position illustrated in FIG. 7 wherein one control valve 66 has been shifted to the right so as to connect the A ports of the left motors 40 and 41. In such condition, the left motors 40 and 41 form a serial combination that is in parallel relation with each of the right motors 43 and 44. In such arrangement the output of the pump 59 will be divided into three equal shares with each of the right motors 43 and 44 receiving one share and the series connected left motors 40 and 41 receiving one share. Since the rate of flow to each of the hydraulic motors is increased from one-fourth to one-third of the output of the pump 59, the motors will be driven at a correspondingly greater speed.

This second speed for the propulsion system can be achieved by shifting any one of the three valves 66, 67 and 68 to an alternate position so that any two of the motors are in series and in parallel with the remaining two motors.

Figure 8:
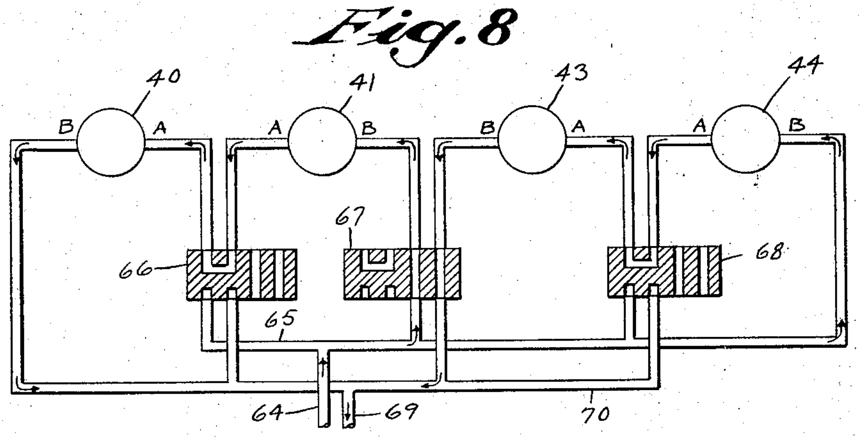

The third and still higher speed is achieved by shifting two of the control valves 66 and 68 to their alternate position so that the pair of left motors 40 and 41 will be in series and the pair of right motors 43 and 44 will also be in series, with the pairs of motors in parallel relative to each other (see FIG. 8). In such condition of the control system, the output of the pump 59 will be divided equally between the pair of left hand motors 40 and 41 and the pair of right hand motors 43 and 44. Since the motors will each receive one-half of the output of the pump 59, the speed at which the motors will rotate will be correspondingly greater than for the first and second speed conditions.

Figure 9:
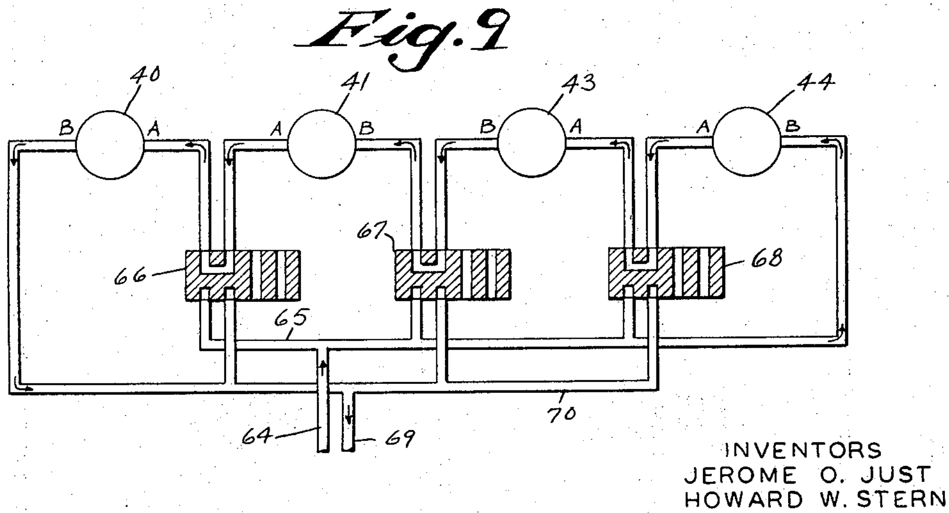

Finally, to achieve the fourth and highest speed for the propulsion system illustrated, all of the control valves 66, 67 and 68 are shifted to their alternate positions so that the four motors are in series with each other. This is illustrated in FIG. 9. The result of such positioning of the control valve will be to have the full output of the pump 59 directed through each of the hydraulic motors and consequently the hydraulic motors will all turn at the maximum speed for the capacity of the pump 59.

By connecting one motor from each pair of motors 40, 41 and 43, 44 together in series, an anti-slip differential action can be obtained whereby the slippage of the tires on one axle will not result in loss of power applied to drive the other axle. This is inherent in the fourth speed setting of the controls since all motors are connected in series. It can also be achieved in the second speed by shifting the control valve 67 to its alternate position so that the inner left motor 41 and inner right motor 43 are serially connected.

By shifting the forward and reverse valve 62 to the extreme left as viewed in FIG. 6 the direction of flow through the conduits, manifolds, valves and hydraulic motors beyond the valve 62 will be reversed. That is, the output of the pump 59 through the output conduit 61 will be directed to the return conduit 69 and the input conduit 64 will be connected to the return conduit 63. Each of the four speeds previously described can be achieved in reverse in the same manner which has been described for the forward direction with the reversing accomplished simply by reversing the flow of the hydraulic fluid through the system.

The control valves 66, 67 and 68 and the forward and reverse valve 62 can be conveniently grouped at a control station that includes a pair of spaced standards 71 rising from the deck 16 and mounting a horizontal plate 72. The three control valves are of standard commercial form and are each mounted on top of the horizontal plate 72. The operating positions of the control valves 66, 67 and 68 are controlled by valve handles 73 which when pulled outwardly towards the operator will place each of the valves in the condition in which there is a direct flow from the pump 59 and reservoir 58 to each of the motors, and which when forced inwardly away from the operator will place the valves in a blocking position to serially connect adjacent hydraulic motors.

The forward and reverse valve 62 is likewise mounted on the horizontal plate 72 to depend from the bottom thereof and is connected to the manifolds 65 and 70. An instruction plate 74 may be mounted across the standards 71 at eye level to indicate the positions of the control valves for the four speeds of the propulsion system.

A separate hydraulic pump may be coupled to the engine 60 to supply hydraulic fluid under pressure for driving of the paddle wheel 20 and for the steering cylinder 57. Such additional pump and the necessary controls accompanying the same have been omitted from the drawings since they form no part of the present invention.

Braking of the barge 15 when operated on land in either the forward or reverse direction is accomplished simply by shifting the forward and reverse valve 62 into the other condition. For example, if the barge were traveling in a forward direction and it were desired to brake, the forward and reverse valve 62 would be shifted to its position in which it will reverse the direction of flow through the motors and this will cause the motors to stop. After coming to a stop, the valve 62 can be placed in its neutral position to lock the hydraulic motors. An adjustable crossover pressure relief valve 75 is connected between the input conduit 64 and the return conduit 69 to limit the pressure built up in the system to a safe value on braking or reversing.

The hydraulic propulsion system has been described as employing four motors in two pairs. However, the system can incorporate any number of hydraulic motors with the result that as many different speeds can be obtained as there are hydraulic motors. For example, six hydraulic motors could be employed to drive a single axle, in three pairs on three separate axles, or six separate axles. To accomplish this it would be only necessary to add two motors to the control system of FIG. 6 together with two additional control valves. However, the principle of the parallel and series connections would remain unchanged and speeds would be increased by increasing the number of motors connected in series thereby reducing the number of shares of the pump output. Similarly, three speeds could be obtained by using three hydraulic motors connected to a single axle or connected to three separate axles in order to obtain equal amounts of torque on each of the driven axles.

We claim:

1. A multiple speed hydraulic propulsion system for a wheeled vehicle, comprising: a prime mover mounted on the vehicle; a constant displacement pump mounted on the vehicle and driven by said prime mover; a reservoir of hydraulic fluid mounted on the vehicle that supplies said pump; two pairs of reversible hydraulic motors with each pair drivingly connected to a separate wheel axle of the vehicle, each of said motors having a pair of inlet-outlet ports; three control valves each connected to one port of two motors; input distribution means receiving the output of said pump and connected to one port of a first motor; and return distribution means leading to said reservoir and connected to one port of a last motor; each of said control valves being shiftable between a first position in which the ports of said motors connected to said valve are connected to said input and return distribution means and a second position in which the ports connected to said valve are connected together so that one or more of said motors may be connected in series and in parallel with others of said motors and serially connected motors, whereby the speed at which said motors drive said vehicle may be increased by increasing the number of serially connected motors to thereby increase the percentage of the output of said pump that is supplied to each of said motors.

2. A hydraulic propulsion system in accordance with claim 1 together with a reversing valve disposed in said input and return distribution means, said reversing valve being shiftable to selectively reverse the connections of said pump and reservoir to said ports of said motors whereby the flow of hydraulic fluid through said motors may be reversed to have said motors drive said vehicle in a reverse direction.

3. A multiple speed hydraulic propulsion system for a wheeled vehicle, comprising: a prime mover mounted on the vehicle; a constant displacement pump mounted on the vehicle and driven by said prime mover; a reservoir of hydraulic fluid supplying said pump and mounted on the vehicle; left and right pairs of first and second reversible hydraulic motors with each pair of motors drivingly connected to a separate wheel axle of the vehicle; each of said motors having a pair of ports;

three control valves; input conduits connected to one port of said first motor of said left pair and connected to one side of each control valve, said input conduits receiving the output of said pump; return conduits connected to one port of said second motor of said right pair and connected to said one side of each control valve, said return conduits leading to said reservoir; conduits connecting the other port of said first motor and one port of said second motor of said left pair to the other side of a first of said control valves; conduits connecting the other port of said second motor of said left pair and one port of said first motor of said right pair to the other side of a second of said control valves; conduits connecting the other port of said first motor and the other port of said second motor of said right pair to the other side of a third of said control valves; each of said control valves being shiftable between one position in which said ports are connected by said respective conduits directly to said input and return conduits and an alternate position in which the ports of said motors connected to the valve are connected together through respective conduits, whereby said motors will drive said vehicle at a relatively slow speed when said control valves are each in said one position, said motors will drive said vehicle at a greater speed when one of said control valves is shifted to said alternate speed, said motors will drive said vehicle at a still greater speed when two of said control valves are shifted to said alternate position, and said motors will drive said vehicle at the greatest speed when said control valves are all shifted to said alternate position.

4. A hydraulic propulsion system in accordance with claim 3, together with a shiftable reversing valve connected between said input conduits and said pump and connected between said return conduits and said reservoir, said reversing valve having a first selectable position in which said input conduits are connected to the output of said pump and said return conduits are connected to said reservoir, a second selectable position in which the output of said pump is diverted directly to said reservoir to prevent the driving of said motors, and a third position in which the output of said pump is connected to said return conduits and said input conduits are connected to said reservoir to have said motors drive said vehicle in a reverse direction at selected speeds.

5. A multiple speed hydraulic propulsion system for a wheeled vehicle, comprising: a pair of spaced axle supports depending from one end of the vehicle; an axle journaled in each of said supports; wheels on said axles; a driven sprocket wheel on each axle; a yoke pivotally attached to each support; a rotatable shaft journaled in each yoke; a pair of reversible hydraulic motors mounted on each yoke and coupled to said shaft; a driving sprocket wheel secured to each shaft; a chain disposed about each pair of driving and driven sprocket wheels; adjustable means for supporting said yokes at selected positions on said supports for adjustment of the distance between each axle and shaft; a prime mover mounted on the vehicle; a constant displacement pump mounted on the vehicle and driven by said prime mover; a reservoir of hydraulic fluid on the vehicle from which said pump is supplied; input conduit means receiving the output of said pump; return conduit means leading to said reservoir; control distribution means adapted to selectively connect one or more of said motors in parallel directly to said input conduit means and said return conduit means and alternately to connect one or more of said motors together with the serial combination of motors connected to said input conduit means and said return conduit means, whereby the parallel connected motors and the serial combinations of motors will receive equal shares of the output of said pump, and the speed at which said motors drive the vehicle will be determined by the number of shares of the output of said pump; and reversing control means disposed in said input and return conduit means to selectively reverse the connections of said motors to said pump and reservoir so that said motors will drive said vehicle in a reverse direction.

References Cited

UNITED STATES PATENTS

| | | | |
|---|---|---|---|
| 2,060,220 | 11/1936 | Kennedy | 180—66 X |
| 2,370,526 | 2/1945 | Doran. | |
| 2,749,137 | 6/1956 | Thomsen et al. | 180—66 X |
| 3,149,464 | 9/1964 | Fauchere | 180—66 X |
| 3,250,340 | 5/1966 | Roberson | 180—66 X |

FOREIGN PATENTS

| | | |
|---|---|---|
| 947,761 | 1/1964 | Great Britain. |

BENJAMIN HERSH, *Primary Examiner.*

MILTON L. SMITH, *Examiner.*